Feb. 20, 1968 F. H. BURGESS 3,369,654

REEL CASE WITH GASKET SUPPORT FOR REEL

Filed Oct. 21, 1964

INVENTOR
FRANK H. BURGESS
BY,
Wolf, Greenfield & Hieken
ATTORNEYS

United States Patent Office 3,369,654 Patented Feb. 20, 1968

3,369,654

REEL CASE WITH GASKET SUPPORT FOR REEL

Frank H. Burgess, Somerset, Mass., assignor to The Morningstar Corporation, Cambridge, Mass., a corporation of Massachusetts Filed Oct. 21, 1964, Ser. No. 405,385
10 Claims. (Cl. 206—52)

This invention relates to tape and film reel cases and more particularly comprises a case that possesses a new and improved gasket support for the reel in the case to prevent the reel from turning in the case or contacting the case walls, which may mar the surfaces of the reel.

It is customary to provide in reel cases molded rubber gaskets which engage the hub of the reel at its top and bottom edges to prevent the reel from rotating in the case. The molded rubber gaskets are relatively expensive and ordinarily must be cemented in place within the case. The cost of the gaskets plus the cost incurred in cementing them in the case contributes significantly to the price of the case.

One important object of this invention is to provide gripping means within the case which is substantially less expensive than the molded rubber gaskets and which nevertheless performs most satisfactorily the function of preventing reel rotation and marring of the reel surfaces on the case surfaces.

A more specific object of this invention is to provide a gasket for a reel case which may be formed as a continuous extrusion and be automatically fed into position in the case and be retained in place without the aid of cement or other adhesive material.

Yet another important object of this invention is to provide gripping means in a reel case which serves to automatically center reels placed in the case and hold the reel surfaces in spaced relationship to the inner surfaces of the case.

To accomplish these and other objects, the reel case of this invention comprises a cover and a base. An upwardly extending column is provided in the base and a downwardly extending column is provided in the cover. The columns are of the same diameter and are adapted to fit within the hub of a reel placed in the case. An annular recess is provided in both the base and the cover immediately about the columns, and the recesses face one another when the case is assembled. An extruded rubber-like gasket is seated in each of the recesses and is positioned to support the top and bottom edges of the hub of a reel disposed within the case.

These and other objects and features of this invention along with its incident advantages, will be better understood and appreciated from the following detailed description of one embodiment thereof, selected for purposes of illustration and shown in the accompanying drawing, in which.

Figure 1:
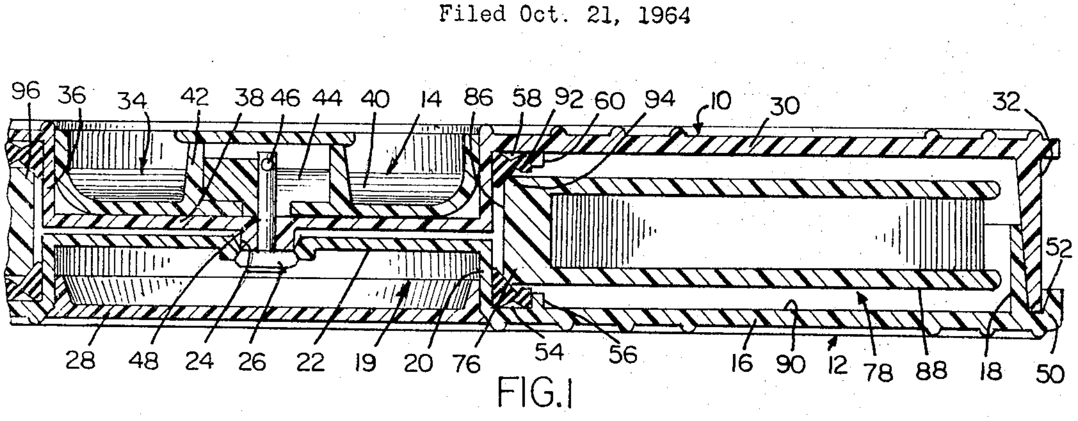
FIG. 1 is a fragmentary cross-sectional view of a reel case constructed in accordance with this invention, shown supporting a reel.
Figure 2:
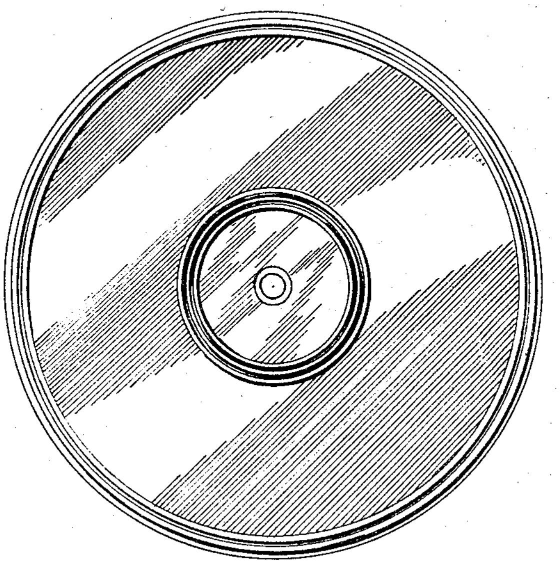
FIG. 2 is a top plan view of the base of the case shown in FIG. 1.

The reel case shown in the drawing is composed of a cover 10 and a base 12 secured together by a locking device 14. The locking device shown is substantially identical to that shown in the Burgess et al. Patent No. 3,074,546, dated Jan. 22, 1963, and its details form no part of the present invention.

The base 12 has a bottom wall 16, an upwardly extending peripheral wall 18 and a central well or column 19 defined by annular wall 20 and end wall 22. The end wall 22 is provided with an opening 24 in its center through which the grommet 26 of the locking device 14 extends when the base and cover are assembled. The bottom of the column 19 is closed by a disc 28 cemented in place substantially in the plane of the bottom wall 16. This relationship is evident in FIG. 1.

The cover 10 includes a top wall 30, a peripheral downwardly extending skirt 32, and a central well or column 34 that includes cylindrical wall 36 and end wall 38. The well or column 34 provides a seat for the handle 40 of the locking device 14. The handle 40 is generally dish-shaped and includes a hollow gripping member 42 that encloses a cam 44 upon which follower 46 acts to draw stem 48 upwardly as viewed in FIG. 1. Upward movement of the stem causes the grommet 26 to expand within the opening 24 and lock the cover and base together. When the handle is turned approximately 90° from the position shown in FIG. 1, the follower 46 lies in a low point on the cam 44, and the stem 48 is allowed to move downwardly as viewed in FIG. 1 to relieve the grommet 26 and allow it to assume its normal diameter wherein it fits through the opening 24 so that the cover and base are unlocked.

It will be noted in FIG. 1 that the skirt 32 and peripheral wall 18 cooperate with a shorter peripheral wall 50 to form a seal about the periphery of the case when the cover and base are connected together. A sealing gasket (not shown) may be provided in the recess 52 defined by the shorter wall 50 and the peripheral wall 18 to enhance the sealing qualities of the case at the edge.

An annular recess 54 is provided in the base 12 of the case immediately about the cylindrical wall 20 of the column 19. The recess 50 in the embodiment shown is defined in part by the outer surface of the wall 20 and in part by a low annular wall 56 uniformly spaced from the outer surface of the wall 20. A similar recess 58 is provided in the cover 10 about the cylindrical wall 36 of the column 34 and is defined in part by the outer surface of the wall 36 and in part by the shallow annular wall 60 uniformly spaced from the outer surface of the wall 36.

The recesses 54 and 58 face one another and each houses a gasket. The gaskets are identical to one another but are mounted in face-to-face relationship, as the gasket in recess 54 is inserted from the top while the gasket in recess 58 is inserted from the bottom.

Figure 3:
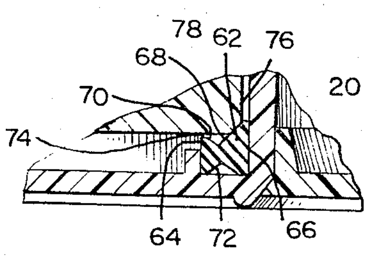
FIG. 3 is an enlarged fragmentary view of the case and reel shown in FIGS. 1 and 2.

The gasket 62 in the recess 54 as shown in FIG. 3 has a pair of generally vertical side surfaces 64 and 66, with the inner surface 66 against the cylindrical wall 20 somewhat taller than the outer surface 64. The upper face of the gasket 62 is defined in major part by an inclined surface 68 which slopes downwardly and outwardly from the top of the inner vertical surface 66. The surface 68 terminates in a V-shaped groove 70 and the face extends upwardly and outwardly from the groove a short distance to the top of the outer vertical surface 64. The inclined surface 68 provides a seat for the lower edge of the hub of the reel disposed within the case as will be explained in greater detail below.

The lower surface of the gasket 62 is provided with a generally V-shaped groove 72 to facilitate compressing the surfaces 64 and 66 together at the bottom of the gasket so as to allow the gasket to be fed easily into the recess 54. This is particularly important if the width of the gasket is greater than the width of the recess for an interference fit between the parts. The interference fit in turn is desirable as it may do away with the necessity of cementing or otherwise adhering the gasket in place in the recess. In the absence of the groove 72 preferably the surfaces 64 and 66 converge slightly toward one another so that the strip of gasket can be easily inserted in the recess.

The inclined surface 68 is exposed in a horizontal direction, as evident in FIGS. 1 and 3, over a substantial portion of its height; that is, the upper outer corner 74 of the top face does not hide or screen the inclined surface 68 in a horizontal direction any appreciable extent because the wall 64 is shorter than the wall 66. Therefore, the surface 68 can serve as a support for the bottom inner edge 76 of the hub of the reel 78 disposed in the case. In FIG. 1 the reel 78 is shown to have a bottom flange 80 and a top flange 82 connected together by hub 84. The bottom edge 76 of the hub inner surface 86 rests on the inclined wall 68 of the gasket 62, and the diameter of the inner surface 86 is greater than the diameter of the cylindrical walls 20 and 36 so that the gasket supports the inner surface 86 in spaced relationship to the outer surfaces of those walls. The inclined wall 68 presents a tapered configuration to the edge 76 of the hub and causes the reel 78 to automatically center itself on the gasket to avoid interference or contact between the inner surface 86 of the hub and the outer surfaces of the walls 20 and 36. Further, the gasket 62 holds the lower surface 88 of the reel flange 78 above the inner surface 90 of the case base 12. Preferably the edge 76 of the reel hub is beveled to complement the inclination of the surface 68 of the gasket so that a flat face-to-face contact is made between these parts. This serves better to center the reel on the gasket and avoids any tendency of the reel to seat itself in an inclined position with respect to the base of the case. Most preferably the bevel of the surface 68 of the gasket is 45°, and the same bevel is provided at the hub edge 76.

The top gasket 92 disposed in the recess 58 in the cover is identical to the gasket 62 in the recess in the base but is inserted upside down so that its inclined surface 94 faces the inclined surface 68 of the gasket 62. The inclined surface 94 in turn cooperates with the upper beveled edge 96 of the reel hub 84. If the edge 96 of the hub is beveled in the same manner as the edge 76, the surface 94 will cooperate with the edge to further center the reel on the case. When the case is closed on the reel, the gaskets through their beveled surfaces will exert equal pressures on the edges of the hub of the reel and hold it in the desired position.

The extruded rubber gaskets used in the case of the present invention are produced in great lengths and are fed into the recesses of the cover and base and cut to length either before or during the time they are inserted in the recesses. This type of gasket represents a very substantial savings over the gaskets used in the prior art. Typically, a pair of molded rubber gaskets may cost approximately fourteen cents to manufacture and assemble while the gaskets of the present invention may be manufactured and assembled for approximately two or three cents. Functionally, the gaskets orient the reel in a proper position within the case so that the surfaces of the flanges and the hub do not become skived. The gaskets grip the edges of the reel and prevent the reel from rotating in the case to avoid the tendency of the material wound on the reel to unwind.

From the foregoing description those skilled in the art will appreciate that numerous modifications may be made of this invention without departing from its spirit. Therefore, it is not intended that the scope of this invention be limited to the specific embodiment illustrated and described. Rather, the scope of this invention is to be determined by the appended claims and their equivalents.

What is claimed is:

1. A reel case comprising
a cover and a base,
an upwardly extending column in the base and a downwardly extending column in the cover of the same diameter and adapted to fit within the hub of a reel within the case, said columns having facing inner walls in close proximity to one another when the case is closed,
an upwardly open annular recess provided in the base about the column and a downwardly open annular recess in the cover about its column, said recesses being defined in part by the columns,
and extruded rubber-like gaskets seated in each of the recesses and having opposed faces for supporting the top and bottom inner edges of the hub of a reel within the case when the case is closed.

2. A reel case as defined in claim 1 further characterized by
said recesses being defined on their outer sides by annular walls extending away from the inner surfaces of the bottom wall of the base and the top wall of the cover, respectively,
and said gaskets seated in the recesses being of greater height than said walls.

3. A reel case comprising
a cover and a base,
an upwardly extending column in the base and a downwardly extending column in the cover of the same diameter and adapted to fit within the hub of a reel within the case, said columns having facing inner walls in close proximity to one another when the case is closed,
an upwardly open annular recess provided in the base about the column and a downwardly open annular recess in the cover about its column,
gasket seated in each of the recesses for supporting the top and bottom inner edges of the hub of a reel within the case when the case is closed,
said gaskets having surfaces which face one another and which diverse from one another in a radial direction away from the columns, said surfaces engaging the inner edges of the hub.

4. A reel case comprising
a cover and a base,
an upwardly extending column in the base and a downwardly extending column in the cover adapted to fit within the hub of a reel within the case, said columns having facing inner walls in close proximity to one another when the case is closed,
gaskets wound about the bottom of the columns and having facing surfaces which diverge in an outward radial direction when the case is closed for engaging the inner bottom and top edges of the hub of the reel in the case to support said reel therein.

5. A reel case as defined in claim 4 further characterized by
said diverging surfaces being faces beveled at substantially 45° from the horizontal.

6. A reel case comprising
a cover and a base,
an upwardly extending column in the base and a downwardly extending column in the cover of the same diameter and adapted to fit within the hub of a reel within the case, said columns having facing inner walls in close proximity to one another when the case is closed,
an upwardly open annular recess provided in the base about the column and a downwardly open annular recess in the cover about its column,
gaskets seated in each of the recesses and having an interference fit therewith,
a groove in the lower surface of the base gasket and the top surface of the cover gasket enabling the width of each gasket to be compressed to facilitate insertion of the gaskets in the recesses,
an outwardly and downwardly approximately 45° beveled surface in the top face of the base gasket and an outwardly and upwardly approximately 45° beveled surface in the bottom face of the cover gasket for engaging the inner bottom and top edges of the hub of a reel to support the reel placed in the case when the case is closed.

7. In combination with the case described in claim 6, a reel having a hub with inner top and bottom edges beveled approximately 45° to mate with the beveled surfaces of the gaskets.

8. A reel case as defined in claim 6 further characterized by said gaskets being made of extruded rubber-like material wound into the recesses.

9. A reel case comprising, a cover and a base, an upwardly extending column in the base and a downwardly extending column in the cover of the same diameter and adapted to fit within the hub of a reel within the case, said columns having facing inner walls in close proximity to one another when the case is closed, an upwardly open annular recess provided in the base about the column and a downwardly open annular recess in the cover about its column, said recesses being defined on their outer sides by annular walls extending away from the inner surfaces of the bottom wall of the base and the top wall of the cover, respectively, and extruded rubber-like gaskets seated in each of the recesses, said gaskets seated in the recesses being of greater height than said walls with the gasket in the recess in the base having an upper surface which is upwardly and radially inwardly inclined for engaging the inner lower edge of the reel hub and said gasket in the recess in the cover having a lower surface which is downwardly and radially inwardly inclined for engaging the inner upper edge of the reel hub when the case is closed.

10. In combination with a reel case as defined in claim 9, a reel having flanges and a hub, said inner lower and upper edges of the hub being inclined to complement the inclination of the mating surfaces of the gaskets.

References Cited

UNITED STATES PATENTS

| | | | |
|---|---|---|---|
| 2,260,962 | 10/1941 | White | 206—52 |
| 2,446,603 | 8/1948 | Morf. | |
| 2,476,593 | 7/1949 | Gerbing | 206—52 |
| 2,996,178 | 8/1961 | Forrest | 206—52 |

FOREIGN PATENTS

| | | |
|---|---|---|
| 700,552 | 12/1964 | Canada. |

THERON E. CONDON, *Primary Examiner.*

LOUIS G. MANCENE, *Examiner.*